UNITED STATES PATENT OFFICE 2,357,935

COMPOSITION OF MATTER AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Application August 2, 1943, Serial No. 497,121

9 Claims. (Cl. 260—404.8)

This invention relates to a new chemical product or composition of matter, our present application being a continuation-in-part of our co-pending application Serial No. 447,154, filed June 15, 1942.

The main object of our invention is to provide a new chemical product or compound that is particularly adapted for use as a demulsifier in the resolution of crude oil emulsions.

Another object of our invention is to provide a practicable method for manufacturing said new chemical product or compound.

Although one of the primary objects of our invention is to provide a new compound or composition of matter that is an efficient demulsifier for crude oil emulsions of the water-in-oil type, the said compound or composition of matter is adapted for use in other arts, as hereinafter indicated. It also may have additional uses in various other fields which have not yet been investigated.

We have discovered that if one oxyalkylates glycerol so as to introduce at least three oxyalkylene radicals for each hydroxyl group, and if the product so obtained is reacted with a polybasic carboxy acid having not over eight carbon atoms, and in such a manner as to yield a fractional ester, due to the presence of at least one free carboxyl radical, one can then esterify said acidic material or intermediate product with at least one mole of an alcoholic compound of the type herein described to give a variety of new compositions of matter which have utility in various arts, and particularly in the demulsification of crude oil.

The compounds herein contemplated may be produced in any suitable manner, but are usually manufactured by following one of two general procedures. In one of said procedures the oxyalkylated glycerol, which is, in essence, a polyhydric alcohol, is reacted with a polybasic acid so as to give an acidic material or intermediate product, which, in turn, is reacted with an alcoholic body of the kind hereinafter described, and momentarily indicated by the formula $R_1(OH)_m$. Generically, the alcoholic body herein contemplated may be considered a member of the class in which $m$ may vary from 1 to 10, although the specific significance of $m$ in the present instance will be hereinafter indicated. The second procedure is to react an alcohol of the formula type $R_1(OH)_m$ with a polybasic acid so as to produce an intermediate product, and then react said intermediate product or fractional ester with the selected oxyalkylated glycerol.

Glycerol may be conveniently indicated by the following formula:

If treated with an oxyalkylating agent and momentarily consideration will be limited to an oxyethylating agent, one may obtain an oxyethylated glycerol of the following formula type:

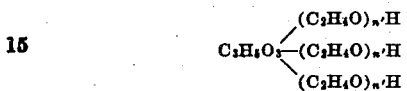

in which the value of $n'$ may vary from 3 to 10 and all the values of $n'$ need not be identical. If a polybasic carboxy acid be indicated by the formula:

then the acyclic reaction product of one mole of oxyethylated glycerol and one mole of a polybasic carboxy acid may be indicated by the following formula:

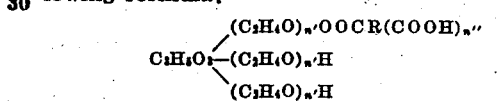

in which $n''$ has the value of one or two. Similarly, if two moles of the polybasic acid be used, then the compound may be indicated by the following formula:

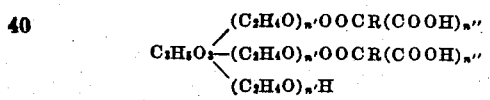

Likewise, if three moles of a polybasic acid are employed, the compound may be indicated by the following formula:

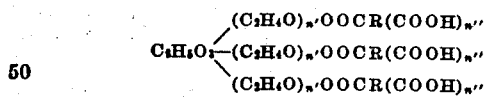

If a fractional ester of the kind exemplified by the three preceding formulae is reacted with one or more moles of an alcohol of the kind previously described in a generic sense as $R_1(OH)_m$, then obviously, one may obtain a material of the type indicated by the following formula:

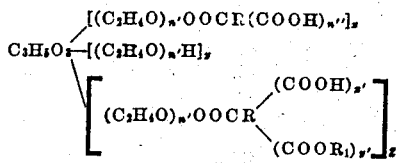

in which $x$ is 0, 1 or 2, $y$ is 0, 1 or 2, and $z$ is 1, 2 or 3, and $x'$ is 0 or 1, and $y'$ is 1 or 2.

It has been previously stated that compounds of the type herein contemplated may be obtained by oxyalkylating agents, without being limited to ethylene oxide. Suitable oxyalkylating agents include ethylene oxide, propylene oxide, butylene oxide and glycid, which, although not included, strictly speaking, by the unitary structure $C_nH_{2n}O$, is included within the meaning of the hereto appended claims and may be simply considered as a variant of propylene oxide, i. e., hydroxypropylene oxide. Similarly, where a carboxylic hydrogen atom appears, it may be replaced by metal, an ammonium radical, or substituted ammonium radical, or by an organic group derived from an alcohol, such as an aliphatic alcohol, an aralkyl alcohol, or an alicyclic alcohol. It may also be converted into an amide, including a polyaminoamide. Thus, the preceding formula may be rewritten in its broader scope, as follows:

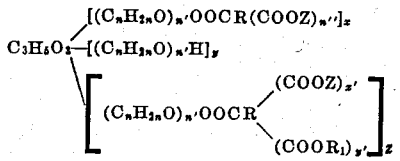

in which $n$ replaces the numbers 2, 3 or 4, Z includes the acidic hydrogen atom itself. In the above formula and hereafter for convenience, $R_1$ is intended to include any hydroxyl group that remains.

If the compounds herein contemplated are obtained under usual conditions, at the lowest temperatures, then the monomeric form is most likely to result.

The production of the compounds herein contemplated is the result of one or more esterification steps. As is well known, esterification procedures can be carried out in various manners, but generally speaking, esterifications can be carried out at the lowest feasible temperatures by using one of several procedures. One procedure is to pass an inert dried gas through the mass to be esterified, and have present at the same time a small amount of a catalyst, such as dried HCl gas, a dried sulfonic acid, or the like. Another and better procedure, in many instances, is to employ the vapors of a suitable liquid, so as to remove any water formed and condense both the vapors of the liquid employed and the water in such a manner as to trap out the water and return the liquid to the reacting vessel. This procedure is commonly employed in the arts, and for convenience, reference is made to U. S. Patent No. 2,264,759, dated December 2, 1941, to Paul C. Jones.

Referring again to the last two formulae indicating the compounds under consideration, it can be readily understood that such compounds, in numerous instances, have the property of polyfunctionality. In view of this fact, where there is at least one residual carboxyl and at least one residual hydroxyl, one would expect that under suitable conditions, instead of obtaining the monomeric compounds indicated, one would in reality obtain a polymer in the sense, for example, that polyethylene glycols represent a polymer of ethylene glycol. The term "polymer" is frequently used to indicate the polymerized product derived from a monomer in which the polymer has the same identical composition as the monomer. In the present instance, however, polymerization involves the splitting and loss of water so that the process is essentially self-esterification. Thus, strictly speaking, the polymeric compounds are not absolutely isomers of the monomeric compounds, but since, for all practical purposes, they can be so indicated, and since such practice is common in the arts concerned with materials of this type, it is so adopted here. Thus, reference in the appended claims to polymers is intended to include the self-esterification products of the monomeric compounds.

In view of what has been said, and in view of the recognized hydrophile properties of the recurring oxyalkylene linkages, particularly the oxyethylene linkage, it is apparent that the materials herein contemplated may vary from compounds which are clearly water-soluble through self-emulsifying oils, to materials which are balsam-like and sub-resinous or semi-resinous in nature. The compounds may vary from monomers to polymers, in which the unitary structure appears a number of times, for instance, 10 or 12 times. It is to be noted that true resins, i. e., truly insoluble materials of a hard plastic nature, are not herein included. In other words, the polymerized compounds are soluble to a fairly definite extent, for instance, at least 5% in some solvents, such as water, alcohol, benzene, dichloroethyl ether, acetone, cresylic acid, acetic acid, ethyl acetate, dioxane, or the like. This is simply another way of stating that the polymerized product contemplated must be of the sub-resinous type, which is commonly referred to as an A resin, or a B resin, as distinguished from a C resin, which is a highly infusible, insoluble resin (see Ellis, Chemistry of Synthetic Resins (1935), pages 862, et seq.).

Reviewing the form as presented, it is obvious that one may obtain compounds within the scope disclosed, which contain neither a free hydroxyl nor a free carboxyl group, and one may also obtain a compound of the type in which there is present at least one free carboxyl, or at least, one free hydroxyl, or both. The word "polar" has sometimes been used in the arts in this particular sense to indicate the presence of at least one free hydroxyl group, or at least, one free carboxyl group, or both. In the case of the free carboxyl group, the carboxylic hydrogen atom may, of course, be replaced by any ionizable hydrogen atom equivalent, such, for example, as a metal, an ammonium radical, a substituted ammonium radical, etc. In the hereto appended claims the word "polar" is used in this specific sense.

We are aware that compounds similar to those contemplated in the present instance may be derived from polyhydroxylated compounds having more than three hydroxyl groups. For instance, they may be derived from acyclic diglycerol, triglycerol, tetraglycerol, mixed polyglycerols, mannitol, sorbitol, various hexitols, dulcitol, pentaerythritol, sorbitan, mannitan, dipentaerythritol monoether, and other similar compounds. Such particular types in which higher hydroxylated materials are subjected to oxyalkylation and then employed in the same manner as oxyalkylated glycerol, as employed in the present instance, are not contemplated in this specific case, although attention is directed to the same.

Reference is also made to other oxyalkylated compounds which may be used as reactants to replace oxyalkylated glycerol, or oxyalkylated ethylene glycol, which latter reactant is described in a copending application hereinafter referred to. The reactants thus contemplated include the type in which there is an amino or amido nitrogen atom. Particularly, when present in a low molal type of compound prior to oxyalkylation, reference being made to polyhydroxylated materials, including those having two or three hydroxyl groups, as well as those having more than three hydroxyl groups. For instance, the oxyalkylated derivatives, particularly the oxyethylated derivatives of ethyldiethanolamine, bis(hydroxyethyl)acetamide, the acetamide of tris(hydroxymethyl)aminoethane, tetrahydroxylated ethylene diamine, etc. Compounds may also be derived from cyclic diglycerol and the like.

Furthermore, for convenience, attention is directed to a somewhat similar class of materials which are described in our application Serial No. 384,597, filed March 21, 1941, now U. S. Patent No. 2,295,166, dated September 4, 1942. Said patent involves the use of the same type of alcoholic bodies for reactants, but is limited, among other things, to the compounds which are essentially symmetrical in nature, for instance, involving the introduction of two alcoholic residues, whereas, in the present instance, one, two, or three, or more might be introduced.

As indicated previously, the polybasic acids employed are limited to the type having not more than eight carbon atoms, for example, oxalic, malonic, succinic, glutaric, adipic, maleic, and phthalic. Similarly, one may employ acids such as fumaric, glutaconic, and various others, such as citric, malic, tartaric, and the like. The selection of the particular tribasic or dibasic acid employed, is usually concerned largely with the convenience of manufacture of the finished ester, and also the price of the reactants. Generally speaking, phthalic acid or anhydride tends to produce resinous materials, and greater care must be employed if the ultimate or final product be of a sub-resinous type. Specifically, the preferred type of polybasic acid is such as to contain six carbon atoms or less. Generally speaking, the higher the temperature employed, the easier it is to obtain large yields of esterified product, although polymerization may be stimulated. Oxalic acid may be comparatively cheap, but it decomposes readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable, and also, everything else considered, the cost is comparatively low on a per molal basis, even though somewhat higher on a per pound basis. Succinic acid or the anhydride has many attractive qualities of maleic anhydride, and this is also true of adipic acid. For purposes of brevity, the bulk of the examples, hereinafter illustrated, will refer to the use of maleic anhydride, although it is understood that any other suitable polybasic acid may be employed. Furthermore, reference is made to derivatives obtained by oxyethylation, although, as previously pointed out, other oxyalkylating agents may be employed.

As far as the range of oxyethylated glycerols employed as reactants is concerned, it is our preference to employ those in which approximately 15 to 24 oxyethylene groups have been introduced into a single glycerol molecule. This means that approximately five to eight oxyethylene radicals have been introduced for each original hydroxyl group.

The oxyalkylation of glycerol is a well known procedure (see Example 11 of German patent No. 605,973, dated November 22, 1934, to I. G. Farbenindustrie A. G.). The procedure indicated in the following three examples is substantially identical with that outlined in said aforementioned German patent.

OXYETHYLATED GLYCEROL

Example 1

184 pounds of glycerol is mixed with ½%, by weight, of caustic soda solution having a specific gravity of 1.383. The caustic soda acts as a catalyst. The ethylene oxide is added in relatively small amounts, for instance, about 44 pounds at a time. The temperature employed is from 150–180° C. Generally speaking, the gauge pressure during the operation approximates 200 pounds at the maximum, and when reaction is complete, drops to zero, due to complete absorption of the ethylene oxide. When all the ethylene oxide has been absorbed and the reactants cooled, a second small portion, for instance, 44 more pounds of ethylene oxide, are added and the procedure repeated until the desired ratio of 15 pound moles of ethylene oxide to one pound mole of glycerol is obtained. This represents 660 pounds of ethylene oxide for 92 pounds of glycerol.

OXYETHYLATED GLYCEROL

Example 2

The ratio of ethylene oxide is increased to 18 pound moles for each pound mole of glycerol. Otherwise, the same procedure is followed as in Example 1, preceding.

OXYETHYLATED GLYCEROL

Example 3

The same procedure is followed as in the two previous examples, except that the ratio of ethylene oxide to glycerol is increased to 21 to one.

OXYETHYLATED GLYCEROL MALEATE

Example 1

One pound mole of oxyethylated glycerol (1 to 15 ratio) prepared in the manner previously described is treated with one pound mole of maleic anhydride and heated at approximately 110° C. for approximately thirty minutes to two hours, with constant stirring, so as to yield a monomaleate.

OXYETHYLATED GLYCEROL MALEATE

Example 2

The same procedure is followed as in the preceding example, except that two moles of maleic anhydride are employed so as to obtain the dimaleate instead of the monomaleate.

OXYETHYLATED GLYCEROL MALEATE

Example 3

The same procedure is followed as in the two preceding examples, except that three moles of maleic anhydride are employed so as to obtain the trimaleate.

OXYETHYLATED GLYCEROL MALEATE

Example 4

The same procedure is employed as in the preceding examples, except that oxyethylated glycerol (ratio 1 to 18) is substituted in place of oxyethylated glycerol (ratio 1 to 15).

OXYETHYLATED GLYCEROL MALEATE

Example 5

The same procedure is employed as in the preceding examples, except that oxyethylated glycerol (ratio 1 to 21) is employed instead of oxyethylated glycerol (ratio 1 to 15) or (1 to 18).

Previous reference has been made to an alcoholic body which has been defined generically by the formula $R_1(OH)_m$. The sub-generic class of alcoholic compounds employed as reactants in the manufacture of the present compounds are materials commonly referred to as hydroxylated high molal esters of monohydric alcohols. They are invariably water-insoluble. They contain at least 11 carbon atoms, and may contain as many as 48 carbon atoms. They usually contain only one hydroxyl group, as, for example, when derived from ricinoleic acid, but in some instances, as, for example, when derived from dihydroxystearic acid, they may contain more than one hydroxyl group. Since such esters are derivatives of monohydric alcohols, the hydroxyl group must be part of the acyl radical of the ester, and cannot be part of the alcohol residue, in contradistinction to esters of the kind exemplified by monoolein, monostearin, etc.

Although the hydroxylated ester employed as a reactant in the manufacture of the compounds herein contemplated is water-insoluble, such ester may be derived from a water-soluble or water-insoluble acid, and from a water-soluble or water insoluble alcohol. Generally speaking, such water-insoluble esters are obtained by the use of either a water-insoluble acid, or a water-insoluble alcohol as a secondary raw material for producing the ester. For instance, ethyl alcohol (a water-soluble alcohol), may be esterified with ricinoleic acid (a water-insoluble acid) to produce water-insoluble ethyl ricinoleate. Similarly, water-insoluble cetyl alcohol can be reacted with water-soluble lactic acid to produce the water-insoluble cetyl lactate. It is also obvious that the monohydric ether alcohols will function in the same manner as an alcohol, and thus may be employed in the production of the esters.

Briefly, then, the water-soluble alcohols or alcohol ethers, which serve as secondary raw materials for esterification to produce the water-insoluble esters, include ethylene glycol monomethyl ether; ethylene glycol monoethyl ether; ethylene glycol monobutyl ether; ethylene glycol monophenyl ether; ethylene glycol monobenzyl ether; diethylene glycol monomethyl ether; diethylene glycol monoethyl ether; diethylene glycol monobutyl ether; methyl alcohol; ethyl alcohol, isopropyl alcohol; normal butyl alcohol; methyl isobutyl carbinol; 2-ethyl butyl alcohol; normal hexyl alcohol; various isomeric amyl alcohols and mixtures thereof, etc. Other alcohols, not necessarily water-soluble, include 4-tertiary amyl cyclohexanol; 2,4-diamyl cyclohexanol; p-tertiary amyl ethanol; ditertiary amylphenoxy ethanol; methyl-amyl carbinol; octyl alcohol; 5-ethyl-nonanol-2; 7-ethyl-2-methyl undecanol-4; 3,9-diethyl tridecanol-6.

Purely as a convenience, then, the secondary raw materials, i. e., the alcohols employed to produce the water-insoluble esters, may be divided into two classes, i. e., the water-soluble alcohols and the high molal water-insoluble alcohols. Such high molal alcohols are invariably water-insoluble and contain at least 10 carbon atoms and not more than 32 carbon atoms. They usually contain only one hydroxyl group, but in some instances, as hereinafter indicated, they may contain more than one hydroxyl group. Such alcohols are generally obtained by reduction of the corresponding fatty acids or esters thereof. The reaction in its briefest form may be indicated as follows:

R.COOH in the above instance may represent any detergent-forming acid, i. e., any of a number of monocarboxy acids having more than 9 and not over 32 carbon atoms, and characterized by the fact that they combine with alkalies such as caustic soda, caustic potash, ammonia, triethanolamine, and the like, to produce soap or soap-like materials. The best examples are, of course, the higher fatty acids, such as oleic acid, stearic acid, palmitic acid, etc. In addition to the higher fatty acids, other well known members include resinic acids, abietic acids, naphthenic acids, and acids obtained by the oxidation of petroleum hydrocarbons, and commonly referred to as oxidized wax acids. Generally speaking, the higher fatty acids are apt to contain from 12–14 carbon atoms as a lower limit, and from 18–22 carbon atoms as an upper limit. Oxidized waxes may contain as many as 30 or 32 carbon atoms. These various acids, when unsaturated, may be totally or partially hydrogenated, and then converted into the corresponding alcohol.

The commonest use of high molal alcohols has been their conversion into sulfates or sulfonates. As to patents which specifically enumerate high molal alcohols applicable for use as reactants in the manufacture of the present compound, see the following: U. S. Patent Nos. 2,110,848, dated March 8, 1938, to De Groote; 2,181,172, dated October 4, 1932, to Daimler et al.; 1,916,776, dated July 4, 1938, to Steindorff et al.; 2,106,242, dated Jan. 25, 1938, to De Groote; 2,110,847, dated Mar. 8, 1938, to De Groote; 2,000,994, dated May 14, 1935, to Schrauth; 2,061,617, dated Nov. 24, 1936, to Downing et al.; 2,061,618, dated Nov. 24, 1936, to Downing et al.; 2,061,619, dated Nov. 24, 1936, to Downing et al.; 2,061,620, dated Nov. 24, 1936, to Downing et al.; 2,171,117, dated Aug. 29, 1939, to Schrauth; 2,187,338, dated Jan. 16, 1940, to Werntz; 1,917,255, dated July 11, 1933, to Harris; 2,170,380, dated Aug. 22, 1939, to Holsten; 1,966,187, dated July 10, 1934, to Schirm; 2,106,243, dated Jan. 25, 1938, to De Groote et al.; and 2,187,339, dated Jan. 16, 1940, to Werntz.

Chemically, it is to be noted that these alcohols represent more than one type, i. e., they include aliphatic, alicyclic, aralkyl, etc. Particularly of interest are those derived from naphthenic acids, oxidized wax acids, and by the total or partial hydrogenation of high molal aromatic alcohols or equivalent procedure. Branched chain alcohols are, of course, included. Any of the various high molal, water-insoluble alcohols occurring naturally in waxes in combined form, may be employed.

As specific examples, mention may be made of the following alcohols: Decyl, undecyl, dodecyl, tetradecyl, octadecyl, cetyl, oleyl, cholesterol, glycols of high molecular weight of the type exemplified by octadecane diol, octamethyl glycol, decamethyl glycol, and also alkyl, cycloalkyl, aralkyl, or aryl ethers of the different polyhydric alcohols, such as, for example, the cresylic, phenylic, benzylic, cyclohexylic, or naphthylic ethers of glycol or glycerol. Similarly, derivatives of diphenyl, such as hydroxy diphenyl and the hydroaromatic homologues, are suitable.

The hydroxy acids, as has been suggested, may be conveniently divided into the water-soluble, low molal type, and the water-insoluble, high molal type. The water-soluble type may be exemplified by glycollic acids, lactic acid, hydroxy butyric acid, etc.

The high molal alcohol acids, i. e., the high molal hydroxy acids, are invariably water-insoluble.

The commonest example is ricinoleic acid. Other hydroxy fatty acids include hydroxystearic acid, dihydroxystearic acid, diricinoleic acid, aleuritic acid, and the like. Similar acids are obtained in the oxidation of paraffin, petroleum hydrocarbon, or wax, and are commonly referred to as hydroxylated wax acids. Hydroxylated wax acids occur as by-products in the oxidation of waxes or similar materials, and are usually separated so that the commonest commercial form of oxidized wax acids represent mixtures comparatively free from the hydroxylated compounds. Hydroxylated acids are produced by other procedures, such as chlorination, either by addition or substitution, as, for example, chlorination of oleic acid or stearic acid. Subsequent reactions involve the removal of the chlorine with the introduction of a hydroxyl radical. Undecylenic acid, derived from castor oil, has been converted into a hydroxy undecenoic acid. Unsaturated hydroxy acids, such as ricinoleic acid, may be treated in various manners, so as to produce derivatives, for example, chlorinated or brominated ricinoleic acid. Such materials are entirely satisfactory for use as reactants in the preparation of materials of the kind herein contemplated. Naturally-occurring naphthenic acids can also be converted into hydroxylated products by following similar procedure. An unsaturated hydroxy acid, such as ricinoleic acid, can be converted into a hydroxylated arylstearic acid. Such procedure contemplates reactions such as those involving ricinoleic acid, benzene, and aluminum chloride in large excess, or involves the desulfonation of a sulfo-aromatic fatty acid. In any event, by employing derivatives of undecylenic acid, or one or more of the various wax acids, naturally-occurring naphthenic acid, ricinoleic acid, diricinoleic acid, or derivatives thereof, as have been enumerated, one can obtain a variety of hydroxylated monocarboxy acids, having at least 11 carbon atoms and not in excess of 36 carbon atoms. Such compounds are the kind herein contemplated as reactants to furnish the alcoholiform hydroxyl.

Hydroxy acids of the kind herein contemplated may also be prepared by the hydrolysis of alpha-halogen acids. For instance, alpha-bromocaproic acid, alpha-bromocaprylic acid, alpha-bromocapric acid, alpha-bromolauric acid, alpha-bromomyristic acid, alpha-bromopalmitic acid, and the like, can be hydrolyzed to give the corresponding alpha-hydroxy acid. Indeed, a reactive alpha-halogen acid may serve as a functional equivalent of an alpha-hydroxy acid by liberation of hydrochloric acid, instead of water. Such type of reaction, however, involves numerous difficulties; and thus, it is better to employ a hydroxy acid.

In some instances derivatives of hydroxylated unsaturated acids are most readily obtained by the employment of an intermediate in which the hydroxyl group is protected. Thus, ricinoleic acid may be acetylated, and such acetyl ricinoleic acid converted into a derivative, for instance, a derivative in which an aryl group is introduced. Such derivative can then be saponified or hydrolyzed so as to regenerate the hydroxyl radical.

The actual preparation of esters and hydroxy acids is well known. The commonest esters, especially those available commercially, are invariably esters of ricinoleic acid. Esters including methyl ricinoleate, ethyl ricinoleate, propyl ricinoleate, butyl ricinoleate, amyl ricinoleate, hexyl ricinoleate, octyl ricinoleate, and the like, are employed for various purposes, and particularly as a constituent of hydraulic brake fluids. In the manufacture of esters in which there is considerable carbon atom interruption between the carboxyl group and the hydroxyl group, for instance, ricinoleic acid, as compared with lactic acid, one can produce the esters in the same manner employed to produce the corresponding esters of non-hydroxylated fatty acids; for instance, procedures employed in the manufacture of methyl oleate, butyl oleate, methyl stearate, butyl naphthenate, etc. Such procedures result in the formation of some polyricinoleic acids, and possibly esters of polyricinoleic acids. Naturally, the esters of polyricinoleic acids may be employed in the present process, for instance, a methyl ester of diricinoleic acid, or similar materials.

As to the manufacture of various esters of the kind herein described, attention is directed to the following United States patents, to wit: U. S. Patent No. 1,160,595, dated Nov. 16, 1915, to Gruter et al.; U. S. Patent No. 2,221,674, dated Nov. 12, 1940, to Ellis; and U. S. Patent No. 2,177,407, dated Oct. 24, 1939, to Hensley. See also Organic Syntheses, volume X, page 88.

It is to be noted that one may, for example, produce materials having a fairly wide range, as far as carbon atoms are concerned. For instance, one may employ octyl lactate on one hand, or else, one might produce an alcohol having as many as 30 carbon atoms from an oxidized wax acid, and esterify the same with ricinoleic acid.

For all practical purposes, however, the best and most desirable compounds are obtained from the most commonly available esters, i. e., the esters of ricinoleic acid and the lower alcohols of the kind previously enumerated.

COMPLETED MONOMERIC DERIVATIVE

Example 1

One pound mole of a product of the kind described under the heading "Oxyethylated glycerol maleate, Example 1" is reacted with one pound mole of octylricinoleate, preferably in the absence of any high boiling hydrocarbon or inert solvent. However, if an inert vaporizing solvent is employed, it is generally necessary to use one which has a higher boiling range than xylene, and sometimes removal of such solvent might present a difficulty. In other instances, however, such high boiling inert vaporizing solvent, if employed, might be permitted to remain in the reacted mass and appear as a constituent or ingredient of the final product. In any event, our preference is to conduct the reaction in the absence of any such solvent and permit the reac-

COMPLETED MONOMERIC DERIVATIVE

Example 2

The same procedure is followed as in Completed monomeric derivative, Example 1, preceding, except that the dimaleate described under the heading "Oxyethylated glycerol maleate, Example 2" is used instead of the monomaleate.

COMPLETED MONOMERIC DERIVATIVE

Example 3

The same procedure is followed as in the two preceding examples, except that the trimaleate is substituted for the monomaleate or dimaleate in the two preceding examples.

COMPLETED MONOMERIC DERIVATIVE

Example 4

The same procedure is followed as in Examples 2 and 3, immediately preceding, except that for each pound mole of the dimaleate, or each pound mole of the trimaleate, instead of using one pound mole of octylricinoleate as a reactant, one employs two pound moles.

COMPLETED MONOMERIC DERIVATIVE

Example 5

The same procedure is followed as in Example 3, preceding, except that for each pound mole of trimaleate, instead of adding one pound mole of octylricinoleate, one adds three pound moles of octylricinoleate for reaction.

COMPLETED MONOMERIC DERIVATIVE

Example 6

Reference to the preceding examples will show that in each and every instance oxyethylated glycerol (ratio 1 to 15) has been employed as a raw material or primary reactant. In the present instance, a more highly oxyethylated glycerol is employed, to wit, one involving the ratio of 1 to 18. (See Oxyethylated glycerol maleate, Example 4, preceding.)

COMPLETED MONOMERIC DERIVATIVE

Example 7

The same procedure is followed as in Example 6, immediately preceding, except that the oxyethylated glycerol employed represents one having an even higher degree of oxyethylation. For example, one indicated by the ratio of 1 to 21. (See Oxyethylated glycerol maleate, Example 5, preceding.)

COMPLETED MONOMERIC DERIVATIVE

Example 8

Octyldihydroxystearate is substituted for octylricinoleate in Examples 1 to 7, immediately preceding.

COMPLETED MONOMERIC DERIVATIVE

Example 9

The octyl ester of hydroxy undecenoic acid is substituted for octylricinoleate, in Examples 1 to 7, preceding.

COMPLETED MONOMERIC DERIVATIVE

Example 10

One pound mole of the octyl ester of polyhydroxylated acids derived by oxidation of petroleum compounds, (see U. S. Patent No. 1,815,886, dated July 21, 1931, to Bruson), is substituted in place of octylricinoleate, in Examples 1 to 7, immediately preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. (See U. S. Patent No. 2,075,107, dated March 30, 1937, to Frasier.)

Sometimes esterification is conducted most readily in the presence of an inert solvent, that carries away the water of esterification which may be formed, although as is readily appreciated, such water of esterification is absent when such type of reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well known procedure and requires no further elaboration.

In the previous monomeric examples there is a definite tendency, in spite of precautions, at least in a number of instances, to obtain polymeric materials and certain cogeneric by-products. This is typical, of course, of organic reactions of this kind, and as is well known, organic reactions per se are characterized by the fact that 100% yields are the exception, rather than the rule, and that significant yields are satisfactory, especially in those instances where the by-products or cogeners may satisfactorily serve with the same purpose as the principal or intentional product. This is true in the present instance. In many cases when the compound is manufactured for purposes of demulsification, one is better off to obtain a polymer in the sense previously described, particularly a polymer whose molecular weight is a rather small multiple of the molecular weight of the monomer, for instance, a polymer whose molecular weight is two, three, four, five, or six times the molecular weight of the monomer. Polymerization is hastened by the presence of an alkali, and thus in instances where it is necessary to have a maximum yield of the monomer, it may be necessary to take such precautions that the alkali used in promoting oxyethylation of glycerol, be removed before subsequent reaction. This, of course, can be done in any simple manner by conversion to sodium chloride, sodium sulfate, or any suitable procedure.

In the preceding examples of the Completed monomeric derivative, Examples 1 to 10, inclusive, no reference is made to the elimination of such alkaline catalyst, in view of the effectiveness of the low multiple polymers as demulsifiers. Previous reference has been made to the fact that the carboxylic hydrogen atom might be variously replaced by substituents, including organic radicals, for instance, the radicals obtained from alcohols, hydroxylated amines, non-hydroxylated amines, non-hydroxylated amines, polyhydric alcohols, etc. Obviously, the reverse is also true, in that a free hydroxyl group may be esterified with a selected acid, varying from such materials as ricinoleic acid to oleic acid, including alcohol acids, such as hydroxy acetic acid, lactic acid, ricinoleic acid and also polybasic acids of the kind herein contemplated.

With the above facts in mind, it becomes obvious that what has been previously said as to polymerization, with the suggestion that by-products or cogeneric materials are formed, may be recapitulated with greater definiteness, and one can readily appreciate that the formation of heat-rearranged derivatives or compounds must take place to a greater or lesser degree. Thus, the products herein contemplated may be characterized by being monomers of the type previously described, or esterification polymers, or the heat-rearranged derivatives of the same, and thus including the heat-rearranged derivatives of both the polymers and esterification monomers, separately and jointly. Although the class of materials specifically contemplated in this instance is a comparatively small and narrow class of a broad genus, yet it is obviously impossible to present any adequate formula which would contemplate the present series in their complete ramification, except in a manner employed in the hereto appended claims.

Although the products herein contemplated vary so broadly in their characteristics, i. e., monomers through sub-resinous polymers, soluble products, water-emulsifiable oils or compounds, hydrotropic materials, balsams, sub-resinous materials, semi-resinous materials, and the like, yet there is always present the characteristic unitary hydrophile structure related back to the oxyalkylation, particularly the oxyethylation of the glycerol used as the raw material. When our new product is used as a demulsifier in the resolution of oil field emulsions, the demulsifier may be added to the emulsion at the ratio of 1 part in 10,000, 1 part in 20,000, 1 part in 30,000, or for that matter, 1 part in 40,000. In such ratios it well may be that one cannot differentiate between the solubility of a compound completely soluble in water in any ratio, and a semi-resinous product apparently insoluble in water in ratios by which ordinary insoluble materials are characterized. However, at such ratios the importance must reside in interfacial position and the ability to usurp, preempt, or replace the interfacial position previously occupied perhaps by the emulsifying colloid. In any event, reviewed in this light, the obvious common property running through the entire series, notwithstanding variation in molecular size and physical make-up, is absolutely apparent. Such statement is an obvious oversimplification of the rationale underlying demulsification, and does not even consider the resistance of an interfacial film to crumbling, displacement, being forced into solution, altered wetability, and the like. As to amidification polymers, for instance, where Z is a polyaminoamide radical, see what is said subsequently.

COMPLETED POLYMERIC DERIVATIVES INCLUDING HEAT-REARRANGED COGENERS

*Example 1*

A material of the kind previously described under the heading "Completed monomeric derivative, Example 3", and obtained by reaction between one pound mole of oxyethylated glycerol with two pound moles of maleic anhydride, followed by reaction with one pound mole of octylricinoleate, is heated at a temperature of approximately 220–240° C., with constant stirring, for a period of two to 60 hours, so as to eliminate sufficient water, in order to insure that the resultant product has a molecular weight of approximately twice that of the initial raw materials.

COMPLETED POLYMERIC DERIVATIVES INCLUDING HEAT-REARRANGED COGENERS

*Example 2*

The same procedure is followed as in the preceding example, except that polymerization is continued, using either a somewhat longer reaction time, or it may be a somewhat higher temperature, or both, so as to obtain a material having a molecular weight of approximately three to four times that of the initial product.

COMPLETED POLYMERIC DERIVATIVES INCLUDING HEAT-REARRANGED COGENERS

*Example 3*

The same procedure is followed as in Examples 1 and 2, preceding, except that one employs reactants derived in the monomeric stage by combining one pound mole of an oxyethylated glycerol with three pound moles of maleic anhydride and reacting such intermediate compound with two pound moles of octyldihydroxystearate.

COMPLETED POLYMERIC DERIVATIVES INCLUDING HEAT-REARRANGED COGENERS

*Example 4*

The same procedure is followed as in Examples 1 to 3, preceding, except that one polymerizes a mixture instead of a single monomer, for instance, a mixture of materials of the kind described in Completed monomeric derivative, Example 3, and in Completed monomeric derivative, Example 4, are mixed in molecular proportion and subjected to polymerization in the manner indicated in the previous examples.

It is understood, of course, that the polymerized product need not be obtained as a result of a two-step procedure. In other words, one need not convert the reactants into the monomer and then subsequently convert the monomer into the polymer. The reactants may be converted through the monomer to the polymer in one step. Indeed, the formation of the monomer and polymerization may take place simultaneously. This is especially true if polymerization is conducted in the absence of an inert solvent, as previously described, and if one uses a comparatively higher temperature, for instance, approximately 200° C. for polymerization. Thus, one pound mole of oxyethylated glycerol maleate of the kind described, ratio 1 to 15, up to 1 to 21, is mixed with two moles of octyldihydroxystearate, and reacted for 20 hours at approximately 200° C., until the mass is homogeneous. It is stirred constantly during reaction. Polyfunctionality may reside in dehydration (etherization) of two hydroxyl groups attached to dissimilar molecules.

The fact that the polymerized and heat-rearranged products can be made in a single step, illustrates a phenomenon which sometimes occurs either in such instances where alcoholic bodies of the kind herein illustrated are contemplated as reactants, or where somewhat kindred alcoholic bodies are employed. The reactants may be mixed mechanically to give a homogeneous mixture, or if the reactants do not mix to give a homogeneous mixture, then early in the reaction stage there is formed, to a greater or lesser degree, sufficient monomeric materials so that a homogeneous system is present. Subsequently, as reaction continues, the system may become heterogeneous and exist in two distinct phases, one being possibly an oily body of moderate viscosity, and the other being a heavier material, which is sticky or sub-resinous in nature. In many instances it will be found that the thinner liquid material is a monomer and the more viscous or resinous material is a polymer, as previously described. Such product can be used for demulsification by adding a solvent which will mutually dissolve the two materials, or else, by separating the two heterogeneous phases and employing each as if it were a separate product of reaction.

Materials of the kind herein contemplated may find uses as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like, as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides, insecticides, emulsifiers for cosmetics, spray oils, water-repellent textile finish, etc. These uses are by no means exhaustive.

However, the most important phase of the present invention, as far as industrial application goes, is concerned with the use of the materials previously described as demulsifiers for water-in-oil emulsions, and more specifically, emulsions of water or brine in crude petroleum.

We have found that the particular chemical compounds or reagents herein described may also be used for other purposes, for instance, as a break inducer in doctor treatment of the kind intended to sweeten gasoline. (See U. S. Patent No. 2,157,223, dated May 9, 1939, to Sutton.)

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote and Keiser. As to using compounds of the kind herein described as demulsifiers, or in particular as surface tension depressants in combination with mineral acid or acidization of oil-bearing strata, reference is made to U. S. Patent No. 2,233,383, dated February 25, 1941, to De Groote and Keiser.

Cognizance must be taken of the fact that the surface of the reacting vessel may increase or decrease reaction rate and degree of polymerization, for instance, an iron reaction vessel speeds up reaction and polymerization, compared with a glass-lined vessel.

As has been previously indicated, the sub-genus employed as an alcohol in the present instance is one of a series of alcoholic compounds which are contemplated in our co-pending applications Serial Nos. 497,118, 497,119, 497,120, 497,122, 497,123, 497,124, 497,125, 497,126, 497,127, 497,128, 497,129, 497,130, 497,131, 497,132, 497,133, 497,134 and 497,135 all filed August 2, 1943.

Having thus described our invention, what we claim as new and desire to secure by Letters Patent is:

1. An ester, being a member of the class consisting of monomers, sub-resinous esterification polymers and cogeneric sub-resinous heat-rearranged derivatives thereof, and of the following formula:

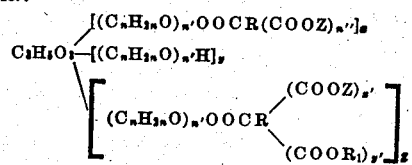

in which R is the carboxyl-free radical of a polycarboxy acid having not over 8 carbon atoms; $R_1$ is a water-insoluble ester radical in which the alcoholic group of said ester radical is that of a monohydric alcohol; said ester radical having at least one hydroxyl radical as a constituent of the acyl radical part of the aforementioned ester radical and said ester radical containing at least 11 and not more than 42 carbon atoms; Z is an acidic hydrogen atom equivalent including the acidic hydrogen atom itself; $n$ represents the numerals 2 to 4; $n'$ represents the numerals 3 to 10; $n''$ represents the numerals 1 to 2; $x$ represents the numerals 0 to 2; $y$ represents the numerals 0 to 2; $z$ represents the numerals 1 to 3; $x'$ represents the numerals 0 to 1; and $y'$ represents the numerals 1 to 2.

2. An ester, being a member of the class consisting of monomers, sub-resinous esterification polymers, and cogeneric sub-resinous heat-rearranged derivatives thereof, and of the following formula:

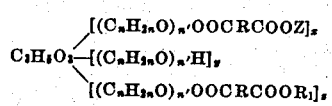

in which R is a carboxyl-free radical of a dicarboxy acid having not over 6 carbon atoms; $R_1$ is a water-insoluble ester radical in which the alcoholic group of said ester radical is that of a monohydric alcohol; said ester radical having at least one hydroxyl radical as a constituent of the acyl radical part of the aforementioned ester radical and said ester radical containing at least 11 and not more than 42 carbon atoms; Z is an acidic hydrogen atom equivalent including the acidic hydrogen atom itself; $n$ represents the numerals 2 to 4; $n'$ represents the numerals 3 to 10; $x$ represents the numerals 0 to 2; $y$ represents the numerals 0 to 2; and $z$ represents the numerals 1 to 3.

3. An ester, being a member of the class consisting of monomers, sub-resinous esterification polymers, and cogeneric sub-resinous heat-rearranged derivatives thereof, and of the following formula:

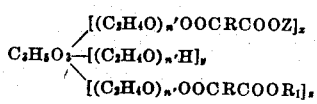

in which R is a carboxyl-free radical of a dicarboxy acid having not over 6 carbon atoms; $R_1$ is a water-insoluble ester radical in which the alcoholic group of said ester radical is that of a monohydric alcohol; said ester radical having at least one hydroxyl radical as a constituent of the acyl radical part of the aforementioned ester radical and said ester radical containing at least 11 and not more than 42 carbon atoms; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to $n$.

4. An ester, being a polar member of the class consisting of monomers, sub-resinous esterification polymers, and cogeneric sub-resinous heat-rearranged derivatives thereof, and of the following formula:

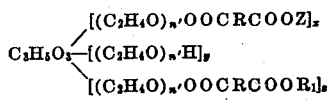

in which R is a carboxyl-free radical of a dicarboxy acid having not over 6 carbon atoms; $R_1$ is a water-insoluble ester radical in which the alcoholic group of said ester radical is that of a monohydric alcohol; said ester radical having at least one hydroxyl radical as a constituent of the acyl radical part of the aforementioned ester radical and said ester radical containing at least 11 and not more than 42 carbon atoms; Z is an acidic hydrogen atom equivalent including the acidic hydrogen atom itself; $n$ represents the numerals 2 to 4; $n'$ represents the numerals 3 to 10; $x$ represents the numerals 0 to 2; $y$ represents the numerals 0 to 2; and $z$ represents the numerals 1 to 3.

5. An ester, being a polar acidic member of the class consisting of monomers, sub-resinous esterification polymers, and cogeneric sub-resinous heat-rearranged derivatives thereof, and of the following formula:

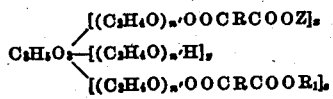

in which R is a carboxyl-free radical of a dicarboxy acid having not over 6 carbon atoms; $R_1$ is a water-insoluble ester radical in which the alcoholic group of said ester radical is that of a monohydric alcohol; said ester radical having at least one hydroxyl radical as a constituent of the acyl radical part of the aforementioned ester radical and said ester radical containing at least 11 and not more than 42 carbon atoms; Z is an acidic hydrogen atom equivalent including the acidic hydrogen atom itself; $n$ represents the numerals 2 to 4; $n'$ represents the numerals 3 to 10; $x$ represents the numerals 0 to 2; $y$ represents the numerals 0 to 2; and $z$ represents the numerals 1 to 3.

6. An ester, being polar acidic member of the class consisting of monomers, sub-resinous esterification polymers, and cogeneric sub-resinous heat-rearranged derivatives thereof, and of the following formula:

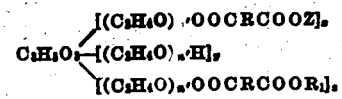

in which R is a carboxyl-free radical of a dicarboxy acid having not over 6 carbon atoms; $R_1$ is a water-insoluble ester radical in which the alcoholic group of said ester radical is that of a monohydric alcohol; said ester radical having at least one hydroxyl radical as a constituent of the acyl radical part of the aforementioned ester radical and said ester radical containing at least 11 and not more than 42 carbon atoms; and the acyl radical being a higher fatty acid acyl radical; Z is an acidic hydrogen atom equivalent including the acidic hydrogen atom itself; $n$ represents the numerals 2 to 4; $n'$ represents the numerals 3 to 10; $x$ represents the numerals 0 to 2; $y$ represents the numerals 0 to 2; and $z$ represents the numerals 1 to 3.

7. An ester, being a polar acidic member of the class consisting of monomers, sub-resinous esterification polymers, and cogeneric sub-resinous heat-rearranged derivatives thereof, and of the following formula:

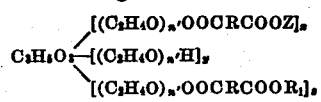

in which R is a carboxyl-free radical of a dicarboxy acid having not over 6 carbon atoms; $R_1$ is a water-insoluble ester radical in which the alcoholic group of said ester radical is that of a monohydric alcohol; said ester radical having at least one hydroxyl radical as a constituent of the acyl radical part of the aforementioned ester radical and said ester radical containing at least 11 and not more than 42 carbon atoms and the acyl radical being an unsaturated higher fatty acid acyl radical; Z is an acidic hydrogen atom equivalent including the acidic hydrogen atom itself; $n$ represents the numerals 2 to 4; $n'$ represents the numerals 3 to 10; $x$ represents the numerals 0 to 2; $y$ represents the numerals 0 to 2; and $z$ represents the numerals 1 to 3.

8. An ester, being a polar acidic member of the class consisting of monomers, sub-resinous esterification polymers, and cogeneric sub-resinous heat-rearranged derivatives thereof, and of the following formula:

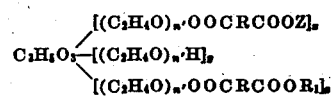

in which R is a carboxyl-free radical of a dicarboxy acid having not over 6 carbon atoms; $R_1$ is a water-insoluble monohydric alcohol ester radical containing at least 11 carbon atoms and not more than 42 carbon atoms and in which ester radical the acid acyl radical part is a ricinoleyl radical; Z is an acidic hydrogen atom equivalent including the acidic hydrogen atom itself; $n$ represents the numerals 2 to 4; $n'$ represents the numerals 3 to 10; $x$ represents the numerals 0 to 2; $y$ represents the numerals 0 to 2; and $z$ represents the numerals 1 to 3.

9. A method for manufacturing esters as defined in claim 1, consisting of reacting an oxyalkylated glycerol with a polycarboxy acid having not over 8 carbon atoms, and subsequently reacting such intermediate product with a water-insoluble hydroxylated monohydric alcohol ester having at least one hydroxyl group as part of the acyl radical and containing at least 11 and not more than 42 carbon atoms.

MELVIN DE GROOTE.
BERNHARD KEISER.